J. HEIL.
TOOL FOR REMOVING CORES AND VALVE CORE STOOLS FROM TIRE VALVES.
APPLICATION FILED AUG. 21, 1920.
1,393,365. Patented Oct. 11, 1921.
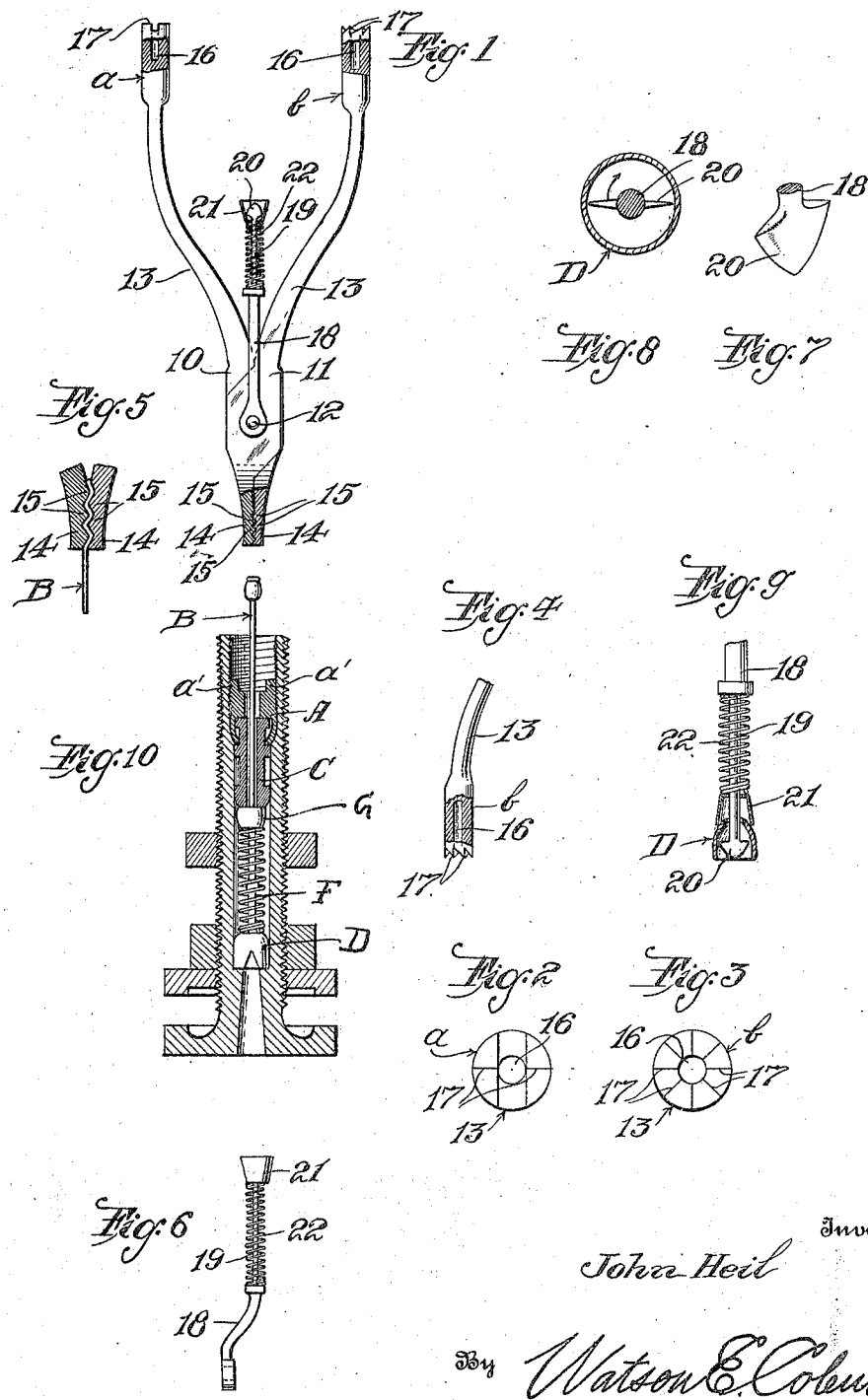
Inventor
John Heil
By Watson E. Coleman
Attorney

UNITED STATES PATENT OFFICE.

JOHN HEIL, OF MELROSE PARK, ILLINOIS.

TOOL FOR REMOVING CORES AND VALVE-CORE STOOLS FROM TIRE-VALVES.

1,393,365. Specification of Letters Patent. Patented Oct. 11, 1921.

Application filed August 21, 1920. Serial No. 405,154.

*To all whom it may concern:*

Be it known that I, JOHN HEIL, a citizen of the United States, residing at Melrose Park, in the county of Cook and State of Illinois, have invented certain new and useful Improvements in Tools for Removing Cores and Valve-Core Stools from Tire-Valves, of which the following is a specification, reference being had to the accompanying drawings.

This invention relates to tire tools, and particularly to tools for removing the valve cores of tire valves when, for any reason these valve cores are damaged so that they cannot be removed by ordinary means.

The general object of my invention is to provide a tool which is adapted to engage with the valve core of a tire valve so that the core may be unscrewed from the tubular body of the valve when this core has had its ears twisted off or otherwise damaged.

A further object is to provide a tool for removing the valve core and which is so formed as to engage the valve core when the valve core has been pulled out of engagement with the packing support.

Another object is to provide a tool of this character which is also adapted for the removal of the valve core stool against which the compression spring of the valve bears when the valve is in place within the tubular valve body.

Other objects will appear in the course of the following description.

My invention is illustrated in the accompanying drawings, wherein:—

Figure 1 is an elevation of a core removing and stool removing tool constructed in accordance with my invention;

Fig. 2 is a top plan view of the shank portion *a;*

Fig. 3 is a top plan view of the shank portion *b;*

Fig. 4 is a fragmentary longitudinal sectional view of the shank portion *b;*

Fig. 5 is a fragmentary sectional view of the jaws 15 showing the manner in which they engage a valve stem;

Fig. 6 is an elevation of the stool removing portion of the stool detached from the body;

Fig. 7 is a perspective view of the arrow-shaped extremity of the shank 18;

Fig. 8 is a transverse section through the stool D showing the head 20 in engagement therewith;

Fig. 9 is an elevation partly in section showing the manner in which the stool removing tool engages with the stool D;

Fig. 10 is a longitudinal sectional view of a tire valve of the character with which my tool is adapted to be used;

Referring to these drawings, it will be seen that my tool comprises a body formed to provide two members 10 and 11 pivoted to each other by means of a pivot screw 12, these members being formed to provide outwardly bowed handles 13 and, opposite the handles, the confronting jaws 14, each of which is semi-circular in form, and the two jaws, when closed, are of such diameter that they may be readily inserted within the valve body. Each of these jaws 14 is provided upon its inner face with teeth 15, the teeth on one jaw being alternately set to the teeth on the opposite jaw so that when the jaws are closed, the teeth interdigitate in the manner of a pair of pincers. Each of the handle members 13 is formed at its extremity with a longitudinally extending bore 16, and the annular surface at the end of each handle member and surrounding this bore is formed with a plurality of teeth 17 preferably in the form of ratchet teeth. The extremity *a* of one of these handle members is formed with two oppositely disposed ratchet teeth. The extremity *b* of the other handle member is formed with a greater number of these teeth. The ends of these handle members are adapted to be used in removing the valve core A from which the ears *a'* have been broken off. If both ears are broken off, then the tool on the extremity *b* is to be used. If only one ear has been broken off, then the tool on the extremity of the handle member *a* is to be used. The bore 16 accommodates the valve stem B.

Sometimes it is the case that the valve core A becomes disengaged from the cone-shaped packing member C, and in that case it is desirable to remove the valve by pulling out on the valve stem. This is accomplished by gripping the valve stem between the jaws 14, the interdigitating teeth of this gripping portion acting to bend the valve stem into a sinuous form longitudinally and thus secure a thorough grip on the valve stem to permit the valve stem, the core and the conical packing supporting member C to be removed after the valve core itself has been taken out of the tube.

Pivotally mounted upon the pivot pin 12 to swing into a position approximately parallel to the length of the implement or at right angles thereto is a shank 18 carrying a longitudinally extending rod 19 terminating at its extremity in a spear-shaped head 20 which is relatively thin. Surrounding this spear-shaped head is a slightly flaring cup 21 which is slidably mounted on the rod and which is urged outward by a spring 22 surrounding the rod 19 and bearing at its end against the enlarged end portion of the shank 18. The use of this device is to remove the stool D which is carried by the stem B and which supports the coiled spring F, which bears against the valve G.

It often happens that all parts of a tire valve and the valve core must be removed before the valve core stool, and when this valve core stool cannot be removed, then the tool formed by the parts 18 to 22 is used. By forcing the conical cap 21 over the stool D and forcing inward on the tool so that the spear-shaped end 20 will pass through the central opening in the stool, which is made of thin brass, then when the spear-shaped blade 20 has been forced through this thin brass, the tool is given a slight turn to carry the spear-shaped head 20 out of alinement with the opening which it has made in the thin brass stool, and then by pulling upon the tool, this stool may be readily removed.

It is oftentimes extremely difficult to remove the various parts of a tire valve, particularly when these parts become broken. My device is particularly designed for the purpose of removing these parts when broken, and has been found thoroughly effective for this purpose. These parts are, of course, very small, located within the relatively long valve tube, and are very hard to get at.

While I have illustrated a particular arrangement of the tool, I do not wish to be limited to the details of construction thereof, as it is obvious that these might be modified in many ways without departing from the spirit of the invention.

I claim:—

1. A tool of the character described having a portion formed to provide a longitudinally extending rod having a spear-shaped, relatively thin head at one end having a width sufficiently small to permit it to be inserted through the tubular valve body of a tire valve, a cup-shaped member surrounding said rod and disposed adjacent this spear-shaped head, and a compression spring urging the cup-shaped member over the head.

2. A valve tool of the character described comprising a body formed to provide two pivoted jaws, handle members extending from said jaws, a shank pivoted to said handle member for movement into or out of parallel relation to the longitudinal axis of the jaws, said shank having a rod extending from it, the rod at its extremity being formed with a sharp-edged spear-shaped head, a cup-shaped member loosely surrounding the rod and normally inclosing the head, and a coiled compression spring disposed between said shank and the cup-shaped member and surounding the rod and urging the cup-shaped member over the head.

3. A tool for removing the spring supporting stools of tire valves comprising a shank formed with a triangular, relatively thin, sharp-edged head at one end, a cup-shaped member of thin metal normally inclosing the head and sliding upon the rod and open toward the point of the head, and a coiled compression spring surrounding the rod and bearing against the cup-shaped member.

In testimony whereof I hereunto affix my signature.

JOHN HEIL.